Aug. 19, 1924.
J. R. CRUIKSHANK
ROTARY TOOTHBRUSH
Filed Sept. 11, 1922
1,505,544
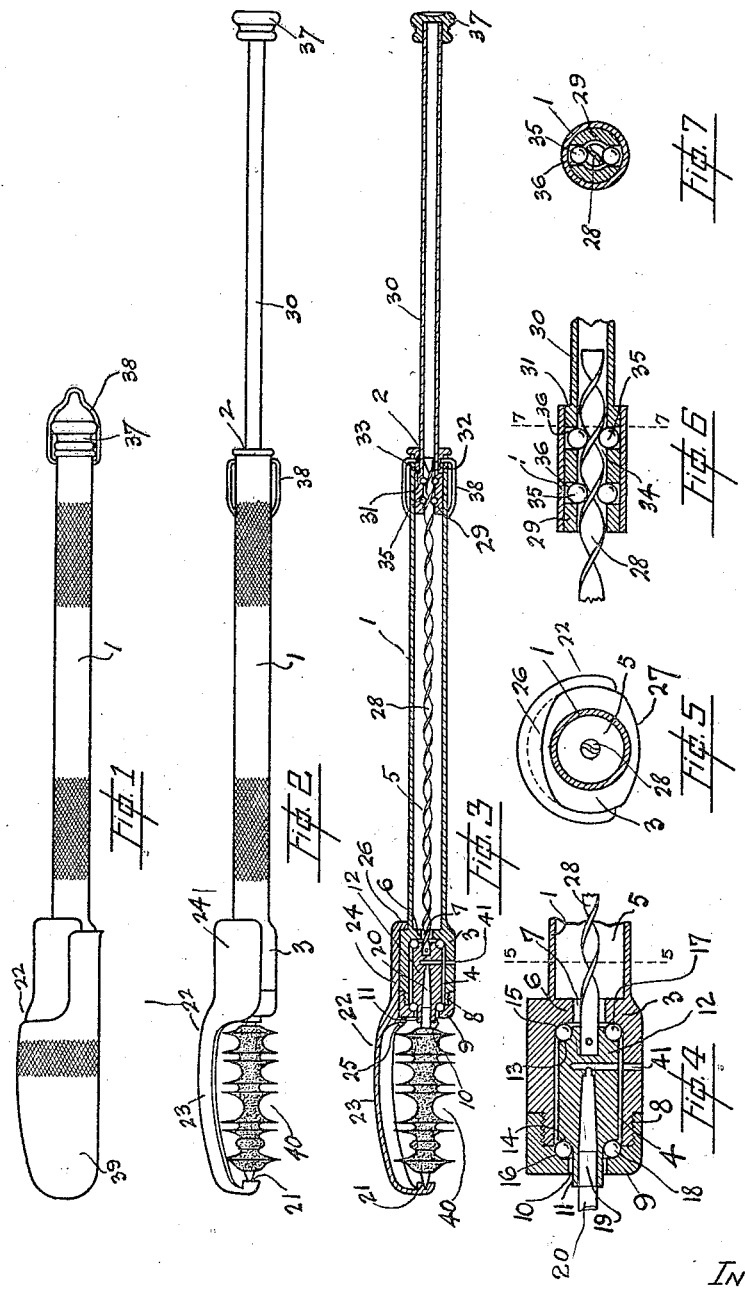
INVENTOR
JAMES ROBERT CRUIKSHANK
By Marker Clerk
Atty Patented Aug. 19, 1924.

1,505,544

UNITED STATES PATENT OFFICE.

JAMES ROBERT CRUIKSHANK, OF VANCOUVER, BRITISH COLUMBIA, CANADA.

ROTARY TOOTHBRUSH.

Application filed September 11, 1922. Serial No. 587,516.

*To all whom it may concern:*

Be it known that I, JAMES ROBERT CRUIK-SHANK, a subject of the King of Great Britain, residing at the city of Vancouver, in the Province of British Columbia, Canada, have invented certain new and useful Improvements in Rotary Toothbrushes, of which the following is a specification.

My invention relates to improvements in rotary toothbrushes, and the object of my invention is to devise a brush of this character which is highly practical and efficient and of simple construction so that it may be manufactured for sale in an attractive and convenient form, thereby providing a toothbrush of great utility and well adapted for the designed purpose.

I attain this object by the construction illustrated in the accompanying drawings in which—

Fig. 1 is an outside view of the toothbrush.

Fig. 2 is an outside view showing the cap removed and the operating handle extended.

Fig. 3 is a longitudinal sectional view.

Fig. 4 is an enlarged detail view of the socketed member and associated parts, in cross section.

Fig. 5 is a cross sectional view taken through the line 5—5 of Fig. 4.

Fig. 6 is an enlarged detail view of the ball bearing nut.

Fig. 7 is a cross sectional view taken through the line 7—7 of Fig. 6.

Similar numerals of reference indicate similar parts throughout the several views.

The device consists of a tubular member 1 of suitable diameter and length open at one end 2 while its opposite end is enlarged as to diameter to form a socket 3 and the bore 4 of the socket is separated from the bore 5 of the tube 1 by a wall 6 through which extends a hole 7 concentric with the bores of the tube and the socket respectively. The outer end of the socket 3 is reduced in diameter and externally threaded as at 8 to receive a correspondingly internally threaded cap 9 provided with a central opening 10 through which extends rotatably an extension 11 formed on the outer end of a socketed member 12 rotatably mounted in the bore 4 of the socket 3. The opposite ends of the member 12 are grooved to form semicircular grooves 13 and 14 respectively and the inside corners of the socket 3 and of the cap 9 are filleted also semi-circularly as at 15 and 16 correspondingly to the grooves 13 and 14 so that there are formed between the opposite ends of the socketed member 12 and the inner end faces of the socket 3 and the cap 9 respectively annular recesses adapted to receive sets of balls, 17 and 18 respectively, as shown more particularly in Fig. 4, and thus the member 12 is rotatably mounted on ball bearings at each end.

19 indicates the socket of the member 12 adapted to receive and frictionally hold when pushed thereinto under hand pressure the inner end of the brush head stem 20, which stem may be formed of any suitable material and length and is rotatably supported at its opposite, or outer, end in a bearing 21 formed in the outer end of a guard 22 removably secured to the socket 3 and suitably shaped to comfortably protect the mouth wall from the brush while rotating. The guard where it extends over the brush is formed concavo-convex both longitudinally and transversely as at 23, terminating at its inner end in a semi-cylindrical portion 24 flanged inwardly at each end, as at 25 and 26, to grip the opposite ends of the socket 3, as shown in Fig. 3, and in order to enable the guard to be removably mounted in place a portion of the outer peripheral curve of the socket is made much flatter than the remaining cylindrical curve, as at 27, in Fig. 5, so that the guard may be first mounted on the flattened portion and then given half a turn to bring it on to the cylindrical portion, to which it is complementary, when it will be seated securely in position, as shown in Figs. 2, 3 and 5.

Secured concentrically into the inner end of the socketed member 12 and extending through the hole 7 in the wall 6 and longitudinally throughout the length of the bore 5 of the tube 1 is a spiral bar 28 forming a screw member the opposite end of which spiral bar engages a nut 29 formed on the inner end of a tubular member 30 reciprocable longitudinally in the bore of the tube 1. The nut 29 fits slidably in the tube 1 and is of larger diameter than the tubular member 30 so that a shoulder 31 is formed, as shown in Figs. 3 and 6, and the bore of the tube 1 is restricted at its outer end, as at 32, to fit the tube 30 and to provide a shoulder 33 which limits the outward stroke of the tube 30 and also prevents the tube from being drawn out of the tube 1.

The nut 29 is formed as a sleeve having a bore 34 through which the spiral member 28 slidably extends and the thread of the nut is formed by ball bearings indicated by the numeral 35 which are positioned freely in holes 36 drilled through the nut walls so that they will rotatably connect the spiral member to the nut, the balls being prevented from disconnection from the spiral by the wall of the tube 1 which fits over the nut and consequently over the holes 36, as shown in Figs. 6 and 7.

The tubular member 30 is provided on its outer end with a knob 37 and the outer end of the tube 1 is provided with a wire loop 38 capable of being swung to engage over the knob when the member 30 is at the end of the instroke to hold it against movement and also for the attachment of a chain thereto or to clear the knob to permit operation of the member, while 39 indicates a cap adapted to cover the brush when not in use.

The brush member, indicated generally by the numeral 40, may be of any suitable form such as a plurality of annular brushes of any approved design or material mounted on and secured to the stem 20 so as to be rotatable therewith, and in order to provide for detachment of the stem from the member 12 a hole 41 is drilled through the socket 3 and the member 12 to connect with the inner end of the socket 19 so that a pin driven into the hole 41 will bear on the end of the stem and force it outwardly.

The manner in which the brush is used will be apparent. In use the cap 39 is removed and the brush member 40 held against the teeth, the socket 3 being held by the fingers of one hand whereupon the brush may be rotated by gripping the tubular member 30, which forms the operating handle, by the fingers of the other hand and moving it back and forth laterally as long as is required.

From the foregoing it will be seen that I have provided a simple, practical, and efficient tooth brush capable of being used with great facility and convenience.

What I claim as my invention is:—

1. A rotary tooth brush comprising, a tubular member having one end formed as a socket reduced at its outer end, the reduced end being externally threaded, a centrally apertured cap secured to the threaded end of the socket, a socketed member rotatably mounted in said socket having an extension at its outer end engaging the aperture of the cap and provided at its opposite end with a spiral member extending longitudinally within the said tubular member, a second tubular member reciprocatory in the first mentioned one having its inner end formed as a nut operatively connecting it to the spiral member, and a stem removably mounted in the socket of the said socketed member provided with a brush.

2. A rotary tooth brush comprising, a tubular member having one end formed as a socket provided with an aperture in its wall, a socketed member rotatably mounted in said socket provided with a spiral member extending longitudinally within the said tubular member, said socketed member having the inner end of its socket extended at right angles as an aperture designed to register with the tubular member socket aperture to form a continuation of the same, a stem mounted in the socket of the socketed member extending at its inner end slightly into the aperture of said socketed member and provided exteriorly of the socket with a brush, and a second tubular member reciprocatory in the first mentioned one having its inner end formed as a nut operatively connecting it to the spiral member.

3. A rotary tooth brush including a tubular member provided at one end with a socket, a socketed member arranged in the socket, a cap detachably connected to the outer end of the socket, anti-friction balls between the ends of the socketed member and said cap and socket, a spiral member fixed to the socketed member and extending into the tubular member, said socketed member, balls and spiral member being withdrawable when said cap is disconnected from the socket, a brush connected to the socketed member, and a second tubular member slidably mounted in the first tubular member and provided at its inner end with a nut engaging the threads of the spiral member.

In testimony whereof I affix my signature at Vancouver, B. C., this 25th day of August, 1922.

JAMES ROBERT CRUIKSHANK.